Jan. 21, 1964
C. A. LIGHT ETAL
3,118,457
EGG PROCESSING MACHINE
Filed Nov. 17, 1961
3 Sheets-Sheet 1
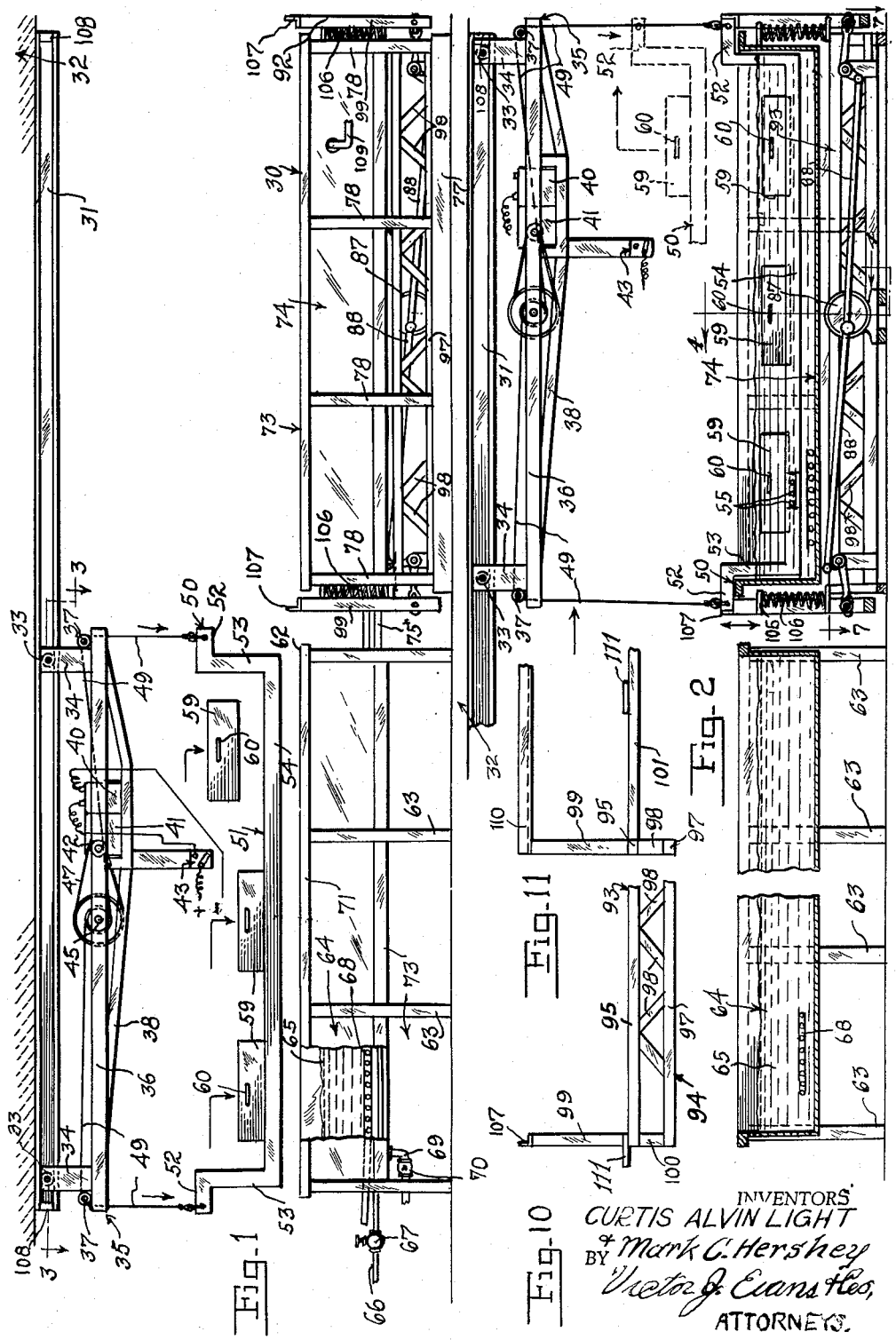
INVENTORS
CURTIS ALVIN LIGHT
& Mark C. Hershey
BY
Victor J. Evans Co.
ATTORNEYS.

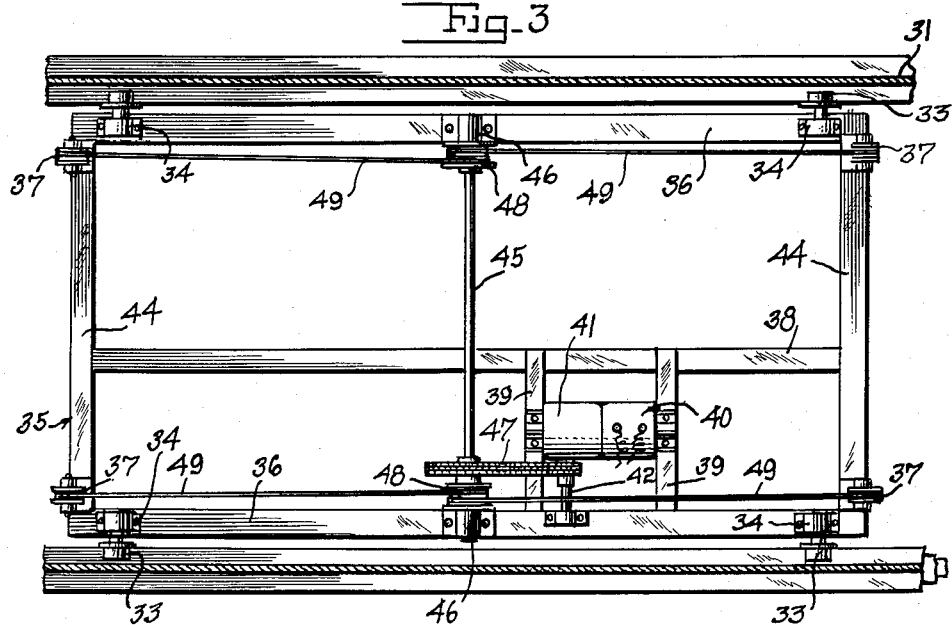
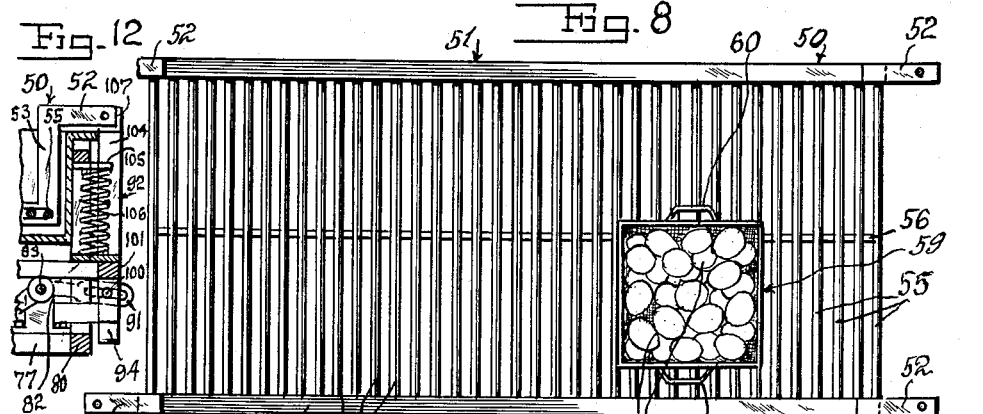
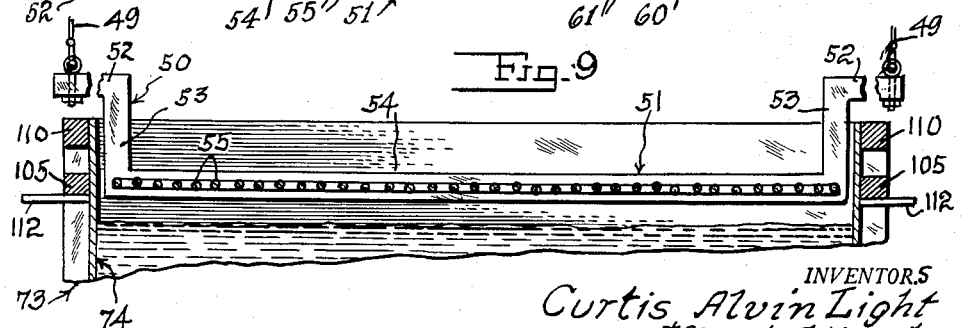

Jan. 21, 1964     C. A. LIGHT ETAL     3,118,457
EGG PROCESSING MACHINE
Filed Nov. 17, 1961     3 Sheets-Sheet 3
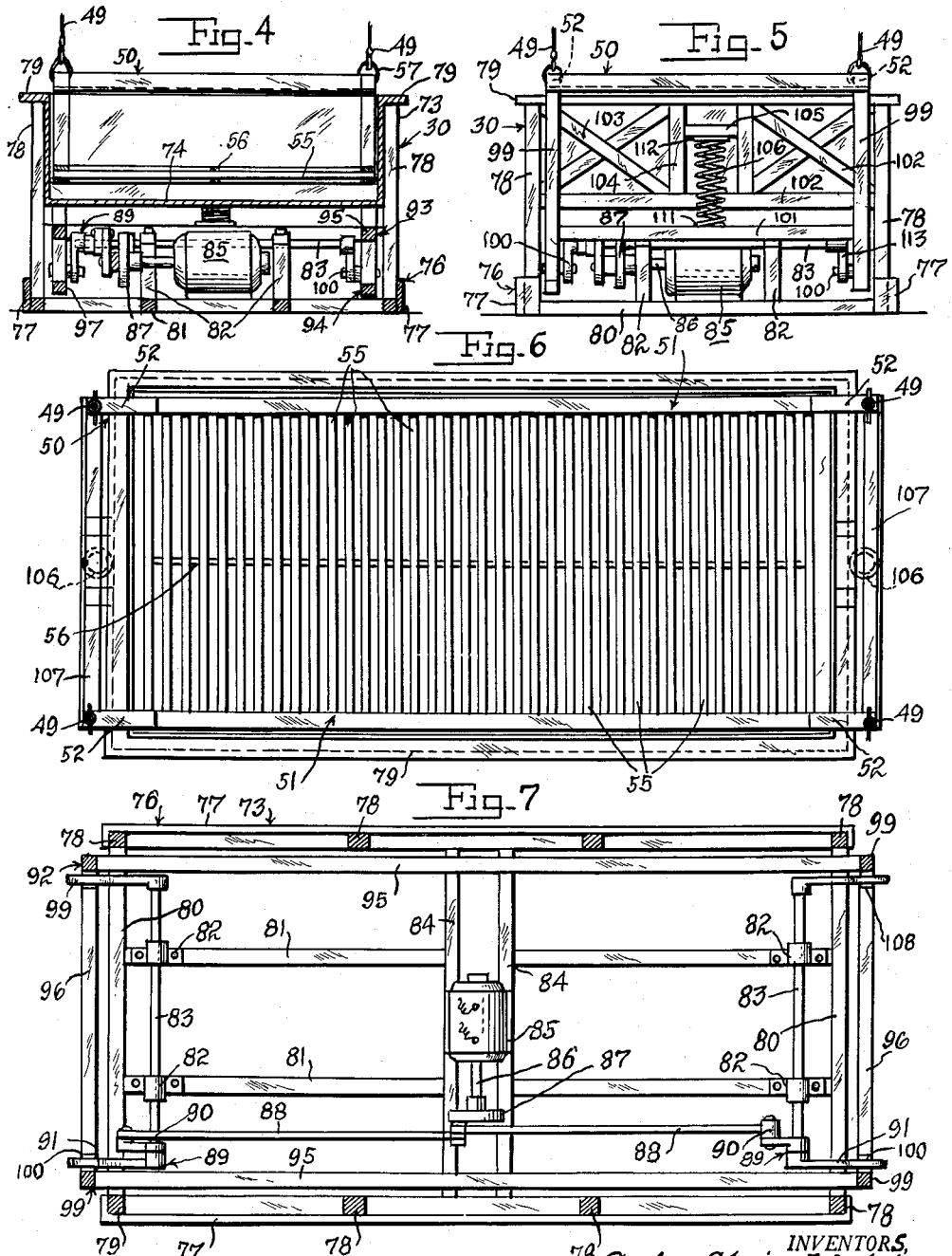
INVENTORS,
Curtis Alvin Light
BY Mark C. Hershey
Victor J. Evans
ATTORNEYS

United States Patent Office 3,118,457
Patented Jan. 21, 1964

3,118,457
EGG PROCESSING MACHINE
Curtis Alvin Light, 767 S. Lincoln St., and Mark C. Hershey, R.F.D. 5, both of Palmyra, Pa.
Filed Nov. 17, 1961, Ser. No. 153,022
2 Claims. (Cl. 134—120)

This invention relates to a machine or apparatus for washing and cleaning articles, and more particularly to a machine for washing and cleaning eggs.

The primary object of the present invention is to provide an apparatus which is adapted to be used for bulk washing and cleaning as well as for bulk sanitizing and bulk antibiotic dipping, and wherein the present invention permits articles such as eggs to be processed and cleaned with increased speed and efficiency.

A further object is to provide an egg washing and processing machine of the type stated which includes a soaking tank that is adapted to selectively receive a carrier which is used for supporting the articles such as the eggs to be cleaned, and wherein there is also provided a washing tank for selectively receiving therein the carrier with the eggs or other articles being washed, the washing tank having associated therewith a vibrator or rocker which serves to provide a sufficient amount of agitation so as to help remove or loosen the dirt from the eggs being cleaned and washed.

Still another object is to provide such a machine that is economical to manufacture and efficient in operation and which is rugged in structure and foolproof in use.

These and other objects and advantages of the invention will become apparent from a reading of the following specification and claims, together with the accompanying drawings, and wherein:

FIGURE 1 is a side elevational view illustrating the egg processing or cleaning and washing machine of the present invention, and with parts broken away and in section.

FIGURE 2 is a fragmentary elevational view generally similar to FIGURE 1 but showing the carrier contiguous to the washing tank as compared to FIGURE 1 and wherein in FIGURE 1 the carrier and associated parts are shown adjacent the soaking tank.

FIGURE 3 is an enlarged sectional view taken on the line 3—3 of FIGURE 1, and with parts broken away and in section.

FIGURE 4 is a sectional view taken on the line 4—4 of FIGURE 2.

FIGURE 5 is an end elevational view of the washing tank and its associated parts.

FIGURE 6 is a plan view illustrating certain constructional details of the present invention.

FIGURE 7 is a sectional view taken on the line 7—7 of FIGURE 2.

FIGURE 8 is a plan view of the egg carrier per se.

FIGURE 9 is a fragmentary sectional view showing the relative position of the carrier when the carrier is being lowered down into the washing tank.

FIGURE 10 is a fragmentary elevational view, with parts broken away and in section, showing a part of the rocker or vibrator.

FIGURE 11 is a fragmentary elevational view illustrating certain constructional details of the present invention.

FIGURE 12 is an enlarged fragmentary sectional view showing a part of the mechanism for actuating the rocker or vibrator.

Referring in detail to the drawings, the numeral 30 indicates the washing and cleaning machine or apparatus of the present invention, and as shown in the drawings, a pair of horizontally disposed spaced parallel rails or tracks 31 are adapted to be secured to a suitable overhead supporting structure such as a ceiling 32, and the numeral 33 indicates rollers which are arranged in engagement with the tracks 31, FIGURES 1 and 3. Vertically disposed arms 34 depend from the rollers 33 and are connected thereto, and the numeral 35 indicates a movable carriage or hoist which includes a pair of horizontally disposed spaced parallel side members 36 that are secured in any suitable manner to the lower ends of the arms 34. Spaced parallel horizontally disposed end members 44 extend between the side members 36 and are secured thereto in any suitable manner, as for example by welding. Pulleys 37 are journaled or supported on the end portions of the support unit 35, for a purpose to be later described. The support unit 35 further includes frame pieces or braces such as the braces 38 and 39, FIGURE 3, and the numeral 40 indicates an electric motor which is suitably affixed to such frame pieces, and the motor 40 is operatively connected to a gear mechanism or transmission 41, and a shaft 4 is driven from the transmission 41. In FIGURE 1 the numeral 43 indicates a manually operable switch which is adapted to be used for controlling actuation of the motor 40. The numeral 45 indicates a horizontally disposed shaft which has its ends journaled in suitable bearings 46 on the hoist or unit 35, and the shaft 45 is operatively connected to the shaft 42 in any suitable manner, as for example by means of a chain and sprocket mechanism 47. A pair of pulleys or drums 48 are suitably mounted on the shaft 45, and cables 49 are connected to the drums 48, and the cables 49 are arranged in engagement with the pulleys 37.

A platform or carrier, indicated generally at 50, having horizontally disposed laterally arranged side members or beams 51, is carried on the ends of the cables 49 which depend from the carriage 35 for movement beneath and along the tracks 31. Each beam 51 includes at each end a post or section 53 having on the upper end thereof a hanger element 52 which projects longitudinally of and away from the lower bed portion 54 of the beam 51. Transversely arranged slats or rods 55 extend across and are secured at their ends to the bed portions 54 for support thereon of crates 59 of eggs 61 as shown in FIGURE 8.

A longitudinally extending brace 56 underlies the midportions of the slats 55 and is secured thereto. Handles 60 on the crates 59 facilitate the movement of the crates 59 onto and off of the bed formed by the slats 55.

The numeral 62 indicates a framework which is shown to comprise vertically disposed spaced parallel posts 63 as well as horizontally disposed crosspieces 71 and 72, and the numeral 64 indicates a tank which is supported by the framework 62, and the tank 64 is adapted to hold a quantity of water or liquid such as the water or liquid indicated by the numeral 65 in FIGURE 1. The numeral 66 indicates a water inlet pipe or conduit or supplying water from a suitable source of supply to the interior of the tank 64, and a control valve 67 is adapted to be connected to the line 66. The numeral 68 indicates heating elements or heating coils whereby the water 65 in the tank 64 can be heated or warmed to the desired temperature, and a drain line or pipe 69 is operatively connected to the tank 64, and the drain line 69 is adapted to have a control valve 70 connected thereto. The tank 64 functions as a soaking tank as later described in this application.

The numeral 73 indicates a frame for supporting a washing tank that is indicated by the numeral 74, and the tank 74 is adapted to receive water or other liquid by means of an inlet pipe or line 75. The frame 73 includes a generally horizontally disposed base portion which is indicated by the numeral 76, and the base portion 76 includes horizontally disposed side pieces 77 and horizontally disposed spaced parallel end pieces 80, and the numeral 78 indicates vertically disposed posts which have their lower ends suitably affixed to the base portion 76, and horizontally disposed flanges or rims are mounted contiguous to the upper ends of the posts 78. Horizontally disposed frame bars or braces 81 extend between the end pieces 80 and are secured thereto in any suitable manner, FIGURE 7, and bearing members 82 are suitably connected to the frame bars 81, there being a pair of horizontally disposed spaced parallel shaft members 83 journaled in the bearing members 82. Cross elements 84 are affixed or mounted as shown in FIGURE 7, and the numeral 85 indicates a motor which is supported above the cross elements 84, and the motor 85 serves to operate or drive a shaft 86 which is provided with an eccentric 87 connected thereto, and there being a pair of opposed rods or arms 88 which are operatively connected to the eccentric 87. Bell cranks or levers 89 have portions 90 connected to the outer ends of the rods 88, and the bell cranks 89 also include portions 91, and the bell cranks 89 are connected to the shaft members 83. Rocker arms 113 are also connected to the shafts 83 as for example as shown in FIGURE 7.

The numeral 92 indicates a rocker unit or vibrator, and as shown in the drawings the rocker unit 92 includes horizontally disposed upper and lower sections 93 and 94, and the upper section 93 is of generally rectangular formation and includes a pair of spaced parallel horizontally disposed side elements 95 as well as spaced parallel end elements 96. The lower section 94 includes a pair of spaced parallel horizontally disposed side bars 97 which are arranged below the side elements 95, and angularly arranged braces 98 are interposed between the side bars 97 and side elements 95 and are secured thereto in any suitable manner. The rocker unit 92 further includes upstanding spaced parallel vertically disposed end bars 99, and pivot pins 100 serve to pivotally connect the rocker arms 113 and portions 91 of the bell cranks 89 to the end bars 99, and these rocker arms 113 and portions 91 are adapted to have slots therein for the projection therethrough of the connecting pins 100 so as to provide sufficient clearance for the parts as they move upon actuation of the motor 85.

As shown in FIGURE 5, a horizontally disposed cross bar 101 extends between the end bars 99 and is secured thereto in any suitable manner. The numeral 102 indicates a horizontally disposed brace bar which extends between end posts 78 and is secured thereto, and there is provided brace pieces 103 which are arranged in crisscross relation above said brace bar 102. A pair of spaced parallel vertically disposed support elements 104 are suitably affixed to each brace bar 102, and the numeral 105 indicates a horizontally disposed lip connected to each pair of support elements 104, and there is provided a spring member or coil spring 106 which is interposed between the lip 105 and the cross bar 101, and the spring member 106 functions as a return spring for the vibrator or rocker unit.

As shown in the drawings, there is provided a pair of horizontally disposed spaced parallel angle irons 107 suitably secured to the adjacent end bars 99 of the rocker unit 92, and these angle irons 107 define cradles for selectively receiving the portions such as the portions 52 of the carrier 50.

As shown in FIGURE 1, stop members 108 are provided adjacent the ends of the tracks 31 for limiting movement of the support unit or hoist 35.

In FIGURE 1 the numeral 109 indicates an overflow line or pipe for the tank 74 whereby in the event the water level exceeds a certain height, the water can flow out through the overflow line 109 to a suitable drain or the like. The tank 74 is adapted to be connected to the tank 64 so that water from the tank 64 can flow into the tank 74 whereby both tanks will be maintained at the same water level.

The ends of the frame 73 have top crosspieces 110 that are horizontally disposed, and these crosspieces 110 function as braces to help strengthen the frame and associated parts. A horizontally disposed bracket 111 is affixed to the member 101, and a similar horizontally disposed bracket 112 is affixed to the lip 105, and these brackets 111 and 112 have the springs 106 interposed therebetween.

From the foregoing, it will be seen that there has been provided an apparatus or machine which is especially suitable for use in processing and washing articles such as eggs, and in use with the parts arranged as shown in the drawings, it will be seen that water or other liquids is adapted to be supplied from a suitable source of supply through the inlet pipe 66 to the interior of the tank 64, and the valve 67 can be opened or closed to control the amount of incoming water. The tank 64 is connected to the tank 74 by means of a pipe such as the pipe 75 so that the water can flow from the tank 64 into the tank 74, and if the water level gets too high, some of the water can flow out through the overflow 109. The temperature of the water in the tank is adapted to be maintained at a desired level by means of heating elements or coils such as the coils 68 which may be electrically operated, and suitable automatic controls can be used for maintaining the water temperature at a constant desired level or range.

The tank 64 is adapted to be supported by the framework 62, and the tank 74 is supported by the framework or frame 73.

The hoist 35 is adapted to be moved so that for example the carrier 50 can be moved into and out of engagement with the tank 64 or 74 as desired or required. The tracks 31 are stationary, and the stop members 108 serve to insure that the hoist 35 will not move too far during use or operation thereof. The hoist 35 is movably connected to the tracks 31 by means of the wheels or rollers 33, and the members 34 serve to connect the rollers 33 to the elements 36 of the support unit or hoist 35. The motor 40 is adapted to be connected to a suitable source of electrical energy by means of wires, conductors or the like, and the motor 40 is controlled by the manually operable switch 43, so that by properly actuating the switch 43 the motor 40 will be energized to actuate the gear case or transmission 41 so as to rotate the shaft 42, and with the chain drive mechanism 47 connecting the shaft 42 to the shaft 45, it will be seen that this will result in rotation of the shaft 45. The shaft 45 has the pair of drums 48 mounted thereon, and the cables 49 are connected to the drums 48 whereby the cables 49 can be wound onto or unwound from the drums 48, and the cables 49 are trained over the pulleys 37 and the lower ends of the cables 49 are connected as at 57 to the movable carrier 50 so that by properly actuating the motor 40, the carrier 50 can be raised or lowered in order to dip the eggs into a particular tank in order to remove eggs from a particular tank. The hoist 35 can be manually moved or else it can be provided with a suitable power mechanism for removing the same relative to the stationary tracks 31.

Initially boxes or crates 59 containing the eggs 61 to be washed are adapted to be positioned on the slats or rods 65, as for example as shown in FIGURE 1, and these eggs 61 may be supplied from any suitable source of supply. With the boxes of eggs on the slats 55, and with the hoist 35 arranged so that it is generally above the tank 64, the switch 43 can be actuated to properly rotate the motor 40 so as to lower the carrier 50 whereby the eggs 61 can be lowered so that they are below the upper level of the water 65 of the tank 64, so that the tank 64 functions as a soaking tank in order to help loosen the dirt or other foreign matter that may be on the eggs. After the eggs have been soaked in the water 65 for a proper length of time, the switch 43 is adapted to be suitably actuated to cause the motor 40 to be energized in the proper manner in order to raise the carrier 50 so that the boxes of eggs will be moved upwardly out of the soaking tank 64.

Next, after the eggs have been soaked in the water in the tank 64, the hoist 35 is adapted to be manually or otherwise moved so that it is generally in a position above the washing tank 74, and then the switch 42 is again actuated to properly energize the motor 40 in order to lower the carrier 50 into the tank 74 whereby the water in the tank 74 is adapted to be used for washing off the eggs, and after the eggs have been properly washed off or cleaned, the switch 43 can be used for reversing the motor 40 so as to raise the carrier 50 and then the boxes of eggs can be lifted off of the carrier 50 and these eggs will then be clean ready for subsequent use or consumption. The slats 55 are arranged so that there is a slight amount of space therebetween whereby as the carrier is raised from a particular tank, water can drain down through the spaces between the slats 55 in order to help insure that the washing or processing of the washing or processing of the eggs carried out according to the present invention will be done in the most effective manner and with a minimum amount of spillage or dripping of water throughout the area in the vicinity of the apparatus. In addition, the boxes 59 may be made of a suitable wire-like or mesh material so that the water can efficiently circulate through such boxes 59 and bring about the washing of the eggs in the most efficient manner and wherein the water can drain out through such boxes after the washing is completed.

The tank 64 is constructed so that when the eggs are lowered into the tank 64, the water 65 will help loosen the dirt or other foreign matter. The tank 74 is provided with a rocking or vibrating means so that such vibrating means can help loosen and remove any dirt or foreign matter adhering to the eggs. This vibrating or rocking means includes the motor 85 which can be actuated by a suitable switch, or else the motor 85 can be automatically actuated when the carrier 50 is in lowered or down position relative to the tank 74, and upon actuation of the motor 85, the shaft 86 can be rotated to turn the eccentric 87, and since the rods 88 are connected to the eccentric 87, it will be seen that this actuation of the motor 85 will cause reciprocation of the rods 88. The rods 88 have the bell cranks 89 connected to the ends thereof, and these bell cranks 89 are connected to the shaft 83, and the bell cranks 89 have portions 91 which are pivotally connected to the rocker unit 92 as at 100. The shafts 83 also have rocker arms 113 connected thereto, and the arms 113 are pivotally connected to the rocker unit 92 by pivot pins 100 and it is seen that the construction is such that as the motor 85 is energized, the rocker unit 92 will be rocked or vibrated relative to the stationary frame 73. Since the rocker unit 92 includes the pair of spaced apart cradles 107 which act as supports for receiving the portions 52 of the carrier 50, it will be seen that as the rocker unit 92 is vibrated or moved, the carrier 50 will likewise be rocked or vibrated and the boxes of eggs on the carrier 50 will be slightly vibrated to help establish vibrations of water in the tank 74 whereby the washing effect exerted by the water in the tank 74 will be increased so that the eggs can be more thoroughly washed due to this agitation or vibration. The springs 106 function as return springs and work in conjunction with the eccentric and associated parts so that with the motor 85 energized, a continuous rocking or vibrating action will be exerted on the rocker unit 92.

The parts can be made of any suitable material and in different shapes or sizes.

Although the invention herein described is fully capable of achieving the objects and providing the advantages hereinbefore mentioned, it is to be understood that it is merely illustrative of the presently preferred embodiment of the invention, and that it is not to be limited to the details of construction herein described other than as defined in the appended claims.

What is claimed is:

1. In an egg washing apparatus, including a frame, a rocker unit mounted in said frame for rocking movement about an axis transversely of and substantially mid-length of said frame, a tank for washing water carried by said rocker unit for movement therewith, said rocker unit having at each end thereof a guide and support member, an overhead trackway having a portion above and spaced from said frame, a carriage rollably supported on said trackway for movement from a position away from said frame to a position over said frame, a platform dependingly carried by said carriage for movement therewith and for upward and downward movement, a hanger element on each end of said platform receivably engageable with the adjacent guide and support member when said carriage is over said frame and said platform is within said tank, and power means for imparting rocking movement to said rocker unit.

2. The apparatus according to claim 1 in which each of said guide and support members is a transversely arranged angle iron disposed with one leg horizontal and the other leg vertical and above said one leg, the guide and support members facing each other.

References Cited in the file of this patent

UNITED STATES PATENTS

| | | |
|---|---|---|
| 105,742 | Tupper | July 26, 1870 |
| 397,533 | Butts | Feb. 12, 1889 |
| 586,858 | Mesta | July 20, 1897 |
| 600,182 | Sparr | Mar. 8, 1898 |
| 729,055 | Forger | May 26, 1903 |
| 854,240 | Rine | May 21, 1907 |
| 2,285,834 | Ryan | June 9, 1942 |
| 2,461,113 | Friedman | Feb. 8, 1949 |
| 2,480,502 | Nieder | Aug. 30, 1949 |
| 2,485,673 | State | Oct. 25, 1949 |